United States Patent [19]

Searle

[11] Patent Number: 5,235,474
[45] Date of Patent: Aug. 10, 1993

[54] APPARATUS AND METHOD FOR AUTOMATIC STORAGE OF COMPUTER DATA

[75] Inventor: Nathan H. Searle, Snohomish, Wash.

[73] Assignee: Advanced Digital Information Corporation, Redmond, Wash.

[21] Appl. No.: 784,158

[22] Filed: Oct. 28, 1991

[51] Int. Cl.$^5$ .............................................. H04N 9/26
[52] U.S. Cl. ........................................ 360/71; 360/92; 414/273; 414/331
[58] Field of Search ................... 360/92, 71; 414/225, 414/277, 281, 331, 273

[56] References Cited

U.S. PATENT DOCUMENTS

| | | | |
|---|---|---|---|
| 4,864,511 | 9/1989 | Moy et al. | 360/92 |
| 5,089,920 | 2/1992 | Bryer et al. | 360/92 |
| 5,157,564 | 10/1992 | Theobald et al. | 360/92 |
| 5,182,687 | 1/1993 | Campbell et al. | 360/92 |

*Primary Examiner*—Edward P. Westin
*Assistant Examiner*—T. Davenport
*Attorney, Agent, or Firm*—Seed and Berry

[57] ABSTRACT

A computer storage unit usable with DAT cassettes. The unit has a tape drive, a carriage that is movable laterally relative to the tape drive opening, and a magazine having slots sized to releasably hold the cassettes therein. The magazine is releasable attachable to the carriage. A pair of gripper arms is rotatably mounted at the end of an arm attached to a traveler which moves the gripper arms between a selected magazine slot and the tape drive opening. The gripper arms are rotatable between a grasping position, a pushing position and an open position using a solenoid-driven actuator arm which linearly moves a head block to which the gripper arms are loosely connected at a position offset from their axis of rotation. A sensor is used in conjunction with the gripper arms to selectively move the cassettes during a test cycle to determine if cassettes are present in the magazine slots and whether the cassettes are in backwards. The magazine has a base and a detachable cover with integrally molded spring latches. Walls in the magazine base which define the magazine slots each have a recess which receives a movable button releasably holding the cassettes within the slots.

52 Claims, 9 Drawing Sheets

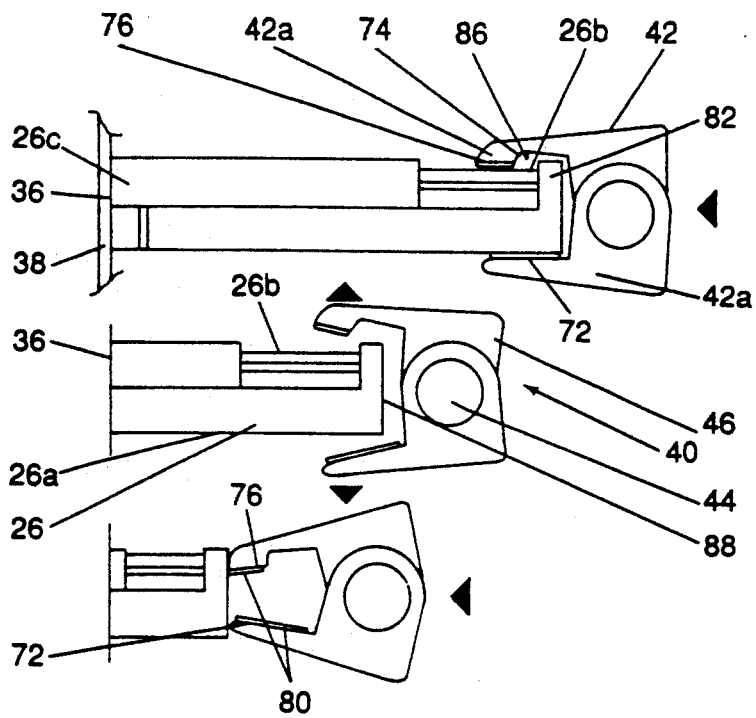
Figure 8a
Figure 8b
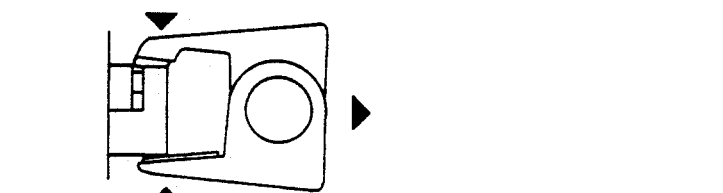
Figure 8c
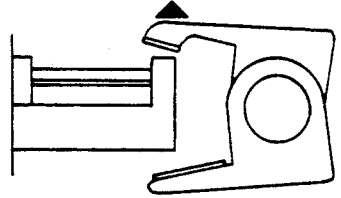
Figure 8d
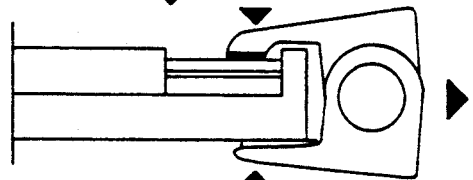
Figure 8e
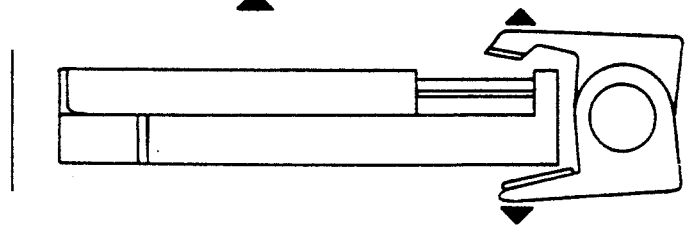
Figure 8f
Figure 8g

APPARATUS AND METHOD FOR AUTOMATIC STORAGE OF COMPUTER DATA

TECHNICAL FIELD

The present invention relates to apparatus used for external storage of computer files.

BACKGROUND OF THE INVENTION

It is important to periodically make backup copies of internally stored computer files to ensure that no information is lost if the original file is destroyed, such as can occur if a computer hard disc crashes. If the files are relatively small in size, the backup copy can be conveniently and quickly made using one or more floppy discs. The data storage capability of personal computers and local area networks has increased sufficiently that it is impractical to store the large quantity of computer data on floppy discs. As such, magnetic tape has been used to store backup copies, with the magnetic tape taking the form of a tape cassette. One such backup system is disclosed in U.S. patent application No. 07/410,136, filed Sep. 20, 1989, and entitled APPARATUS AND METHOD FOR AUTOMATIC STORAGE OF COMPUTER DATA.

Additionally, due to the increasingly large number of computer files used by computers and the limited local high speed disc memory available, it has become necessary to provide large volume, extended storage capability not utilizing the local memory. For example, the hard disc memory of all computers can only be used to store so many files before the memory becomes full or access time increases to an unacceptable level. Thus, it is desirable to provide external storage for computer files other than for backup purposes.

For various reasons, the use of digital audio tape (DAT) cassettes for storing computer files is desirable. These cassettes have a design that differs from existing tape cassettes used for file storage and require a specially constructed storage unit. The present invention provides such a storage unit.

SUMMARY OF THE INVENTION

The present invention resides in a computer storage unit usable with tape cassettes. The storage unit has a tape drive with an opening to receive one of the tape cassettes, a carriage, and a carriage drive providing drive to the carriage to selectively move the carriage laterally relative to the tape drive opening.

The storage unit further includes a magazine having a plurality of slots. Each of the slots is sized to releasably hold one of the cassettes and has an open side. The magazine is releasably attachable to the carriage for travel therewith with the open sides of the magazine slots positioned toward the tape drive opening. The carriage drive is operable to move the carriage laterally to position a selected one of the magazine slots at the tape drive opening and hold the selected magazine slot in generally planar alignment with the tape drive opening for selected movement of one of the cassettes between the selected magazine slot and the tape drive opening.

The storage unit also includes a pair of gripper arms rotatable between a grasping position with the gripper arms closed sufficiently to grasp one of the cassettes, a pushing position with the gripper arms closed sufficiently to engage and push against one of the cassettes, and an open position with the gripper arms open sufficiently to receive one of the cassettes therebetween and release the cassette if grasped therein. A traveler is provided which has the gripper arms attached for travel therewith. A traveler drive provides drive to the traveler to selectively move the traveler so as to move the attached gripper arms between the selected magazine slot and the tape drive opening.

An actuator is mounted to the traveler for travel therewith. The actuator selectively rotates the gripper arms between the grasping position, the pushing position, and the open position. A controller controls operation of the actuator and the traveler drive to selectively rotate and move the gripper arms to move selected ones of the cassettes in the magazine slots into the tape drive opening and remove the cassette therein from the tape drive opening and return the cassette to the desired one of the magazine slots.

The controller selectively controls the actuator and the traveler drive to position the gripper arms at the selected magazine slot to grasp the cassette therein, and then to move the gripper arms with the cassette grasped therein toward the ape drive opening and, upon partial insertion therein prior to engagement by the tape drive, to release the cassette. The controller also controls the actuator and the traveler drive to next rotate the gripper arms into the pushing position and push the cassette sufficiently far into the tape drive opening for engagement by the tape drive. In such fashion, the cassette can be pushed into the tape drive opening by the gripper arms while in the pushing position farther than achievable with the gripper arms grasping the cassette while in the grasping position.

When ejected by the tape drive, the controller selectively controls the actuator and the traveler drive to move the traveler to position the gripper arms at the tape drive opening to grasp the cassette therein, and then to move the gripper arms with the cassette grasped therebetween toward the selected magazine slot. Upon return of the cassette to the selected magazine, the gripper arms release the cassette.

The storage unit is designed for use with digital audio tape DAT) cassettes having a movable cover door which is in the open position when the cassette is within the tape drive and a closed position when the cassette is sufficiently withdrawn from the tape drive. Such cassettes have a fixed portion exposed when the cassette is ejected from the tape drive. The controller selectively controls the actuator and the traveler drive to initially grasp the cassette by the fixed portion of the cassette when ejected, and then to move the gripper arms with the cassette grasped therebetween by the fixed portion toward the selected magazine slot until the movable cassette cover door returns to the closed position. Then, the controller causes the gripper arms to release the cassette and then grasp the cassette by the closed cover door of the cassette. Next, the controller moves the gripper arms with the cassette grasped therebetween by the closed cover door toward the selected magazine slot and, upon return of the cassettes to the selected magazine slot, causes the gripper arms to release the cassette.

In the preferred embodiment, the traveler includes a pivot pin, and the gripper arms are rotatably mounted on the pivot pin for movement between the grasping, pushing and open positions. The actuator includes an actuator arm selectively linearly movable relative to the traveler and a head block fixedly attached to the actuator arm. Each of the gripper arms is loosely connected to the head block at a position offset from the pivot pin such that linear movement of the actuator arm in one direction moves the head block to cause rotation of the grippers arms about the pivot pin to open the gripper arms, and linear movement of the actuator arm in an opposite direction moves the head block to cause rotation of the gripper arms about the pivot pin to close the gripper arms. The gripper arms each include a lever rigidly attached thereto and rotatably received in an opening in the head block to provide a loose connection of the gripper arms to the head block so as to rotate the gripper arms about the pivot pin in response to linear movement of the actuator arm. In the disclosed embodiment, the actuator includes a solenoid .which selectively moves the actuator arm.

The traveler is positioned above the tape drive and has a platform which is movable between a position rearward of the tape drive to a position forward thereof, generally over the tape drive. The traveler further includes a forward-reaching arm with a rearward end portion rigidly attached to the platform and a forward end portion to which the gripper arms are rotatably attached by pivot pin. Selective movement of the platform between the forward and rearward positions moves the gripper arms between the selected magazine slot and the tape drive opening. The forward-reaching actuator arm is in general alignment with the traveler arm. The actuator arm has a rearward end portion connected to an actuator that selectively linearly moves the actuator arm forwardly and rearwardly relative to the traveler, and a forward end portion with the head block fixedly attached thereto.

Each of the gripper arms includes an elongated grasping member extending along a lower edgewise portion of the gripper arms and projecting toward the tape drive opening for grasping and pushing of the cassettes. When used with DAT cassettes having a protruding fixed portion exposed when the cassette is ejected from the tape drive, the grasping member of one of the gripper arms has a face portion facing generally toward the other of the grasping members. The face portion is sized to engage the protruding fixed portion of the cassette and frictionally grasped the cassette when being initially removed from the tape drive opening.

The storage unit further includes a light source generating a beam of light and a light detector detecting when the beam is broken. When broken, the detector generates a broken beam signal. The light source and detector are positioned such that the beam projects across the tape drive opening. The controller controls operation of the actuator and the traveler drive during a test cycle to selectively rotate and move the gripper arms to sequentially move from each of the magazine slots any cassette therein toward the tape drive opening sufficient to break the beam. The controller determines the presence or absence of a cassette in each of the magazine slots based upon whether or not the broken beam signal is generated when the gripper arms are moved toward the tape drive opening sufficient to break the beam if a cassette were in a particular one of the magazine slots at which the gripper arms are positioned.

The traveler drive is a stepper motor. The controller controls operation of the actuator and the stepper motor during the test cycle to selectively rotate and move the gripper arms to sequentially move the cassette from each of the magazine slots having one therein toward the tape drive opening a preselected distance. When the storage unit is used with cassettes that cannot be fully inserted into the tape drive opening if inserted backwards, the controller includes a counter to count the steps the stepper motor operates when attempting to move the cassette the preselected distance and a comparator to compare the counted steps for each cassette to a predetermined number of steps required to move a cassette the predetermined distance if correctly positioned in the magazine slot. The controller generates an error signal indicating a difference in the counted steps and the predetermined steps if such occurs to thereby indicate a cassette is in backwards in the magazine slot.

The light source generating the beam of light and the light detector are also used to determine when one of the cassettes is in a position between the magazine and the tape drive, not fully in one of the magazine slots or fully in the tape drive. The controller inhibits operation of the carriage drive in response to the detector signal so that movement of the carriage is prevented if a cassette is improperly positioned to avoid damage to the storage unit.

The light source and detector are also used to detect when one of the cassettes is in a position to which ejected by the tape drive. The controller controls operation of the actuator and the traveler drive to selectively rotate and move the gripper arms to remove the ejected cassette from the tape drive and move the ejected cassette to a selected one of the magazine slots.

The tape drive is removably mounted within a stationary housing using a mounting bracket to which the tape drive is removably mounted. The housing has a mounting flange with mounting apertures therein and the mounting bracket has an alignment flange with aperture precisely corresponding in position to the mounting flange apertures. The mounting flange and the alignment flange are positionable abutting one another to secure the tape drive within the housing during operation of the storage unit. The storage unit further includes a plurality of removable fasteners which pass through the mounting flange apertures and the alignment flange apertures to detachable hold the mounting flange and the alignment flange securely together and the tape drive in precise alignment during operation of the storage unit, yet allow easy and quick removal of the tape drive from the housing for repair or replacement.

The mounting bracket further includes a support arm rigidly attached thereto which is removably insertable into a receiver in the housing as the tape drive is moved into position within the housing. The support arm provides support against movement between the housing and the tape drive during operation of the storage unit.

The magazine has first connector and the carriage has a mating second connector. The first and second connectors are connected together during operation of the storage unit to securely hold the magazine against movement relative to the carriage, and are selectively disconnectable for storage of the magazine separate from the carriage. The first connector includes a plurality of resilient fingers projecting downward from a bottom side of the magazine located toward the carriage, and the second connector includes a recess in the carriage sized and shaped such that the resilient fingers releasably snap fit into the carriage recess.

The carriage recess is a reverse tapered hole in the carriage having a smaller diameter opening toward the magazine and a larger diameter opening away from the magazine to define a catch wall portion therebetween.

The fingers have a length to extend into the hole when the magazine is positioned on the carriage and have an enlarged distal end sized to pass through the smaller diameter opening upon movement of the fingers together to present a reduced cross-section and to move outward when within the larger diameter opening with the enlarged distal ends engaging the catch wall portion of the hole to securely, but releasably, hold the magazine to the carriage.

The magazine has legs projecting downward from the bottom side of the magazine beyond the resilient fingers to provide a stable support for the magazine when removed from the carriage and placed with the legs downward on a flat surface The magazine legs have sufficient length to hold the resilient fingers out of contact with the flat surface. The magazine legs are arranged relative to the carriage to serve as guides to align the magazine resilient fingers with respect to the carriage recess when attaching the magazine to the carriage.

The magazine includes a base having the slots therein and a detachable cover. The base has a protrusion at each end and the cover has a rotatable latch at each end with an aperture therein to receive one of the protrusions of the base. Each of the latches is rotatable between a lock position receiving one of the protrusions in the latch aperture to securely attach the cover to the base, and a release position with the latch moved clear of the protrusion to allow removal of the cover from the base. Each of the latches has a spring biasing the latch into the locked position.

The latches and the springs are formed integral with one or the other of a pair of end walls of the cover. Each of the latches is positioned in an aperture in one of the cover end walls defined by an edge portion of the cover. Each of the springs comprises a pair of torsion spring arms aligned along a latch hinge line and connecting opposing edge portions of the latch with adjacent edge portions of the cover aperture.

The cover has a top side positioned above the cassettes when the cassettes are positioned in the magazine slots. The cover further includes a strip of resilient material adhered to an inside surface of the cover top side. The strip extends along the cover top side sufficient to overlap all cassettes in the magazine slots and has sufficient thickness to engage the cassettes in the magazine slots when the cover is installed on the base and apply spring force on the cassettes to hold them against movement within the magazine.

The magazine has walls defining the magazine slot, and one of the walls for each of the slots has a recess with a button movably positioned therein and projecting toward an adjacent one of the magazine slots. The button is biased to move sufficiently into the adjacent magazine slot to project into an aperture in the cassette positioned therein and releasably hold the cassette in the magazine slot. Upon sufficient force being applied by the cassette through operation of the gripper arms, the button is movable toward the recess to release the cassette.

The button is mounted on a member having opposing edge portions. The wall recess includes a pair of side grooves which receive and retain therein the button member edge portions. The side grooves have sufficient width to permit movement of the button member toward the adjacent magazine slot to allow the button to project into the cassette aperture and away from the adjacent magazine slot to release the cassette from the adjacent magazine slot. The button is biased toward the adjacent magazine slot by a resilient foam spring positioned between the wall in which the recess is formed and the button member.

The invention further includes a method of performing computer storage and cassette position testing in the manner previously described.

Other features and advantages of the invention will become apparent from the following more detailed description, taken in conjunction with the accompanying drawings.

BRIEF DESCRIPTION OF THE DRAWINGS

FIG. 3A is an enlarged fragmentary cross-sectional top view of one of the divider walls of the magazine base shown in FIG. 3 showing a button plate engaging an aperture in a cassette.

FIGS. 8A–8G illustrate the sequence of operation of the gripper arms of FIG. 5 as they move a cassette to insert the cassette within the tape drive and remove the cassette from the tape drive.

DETAILED DESCRIPTION OF THE INVENTION

Figure 1:
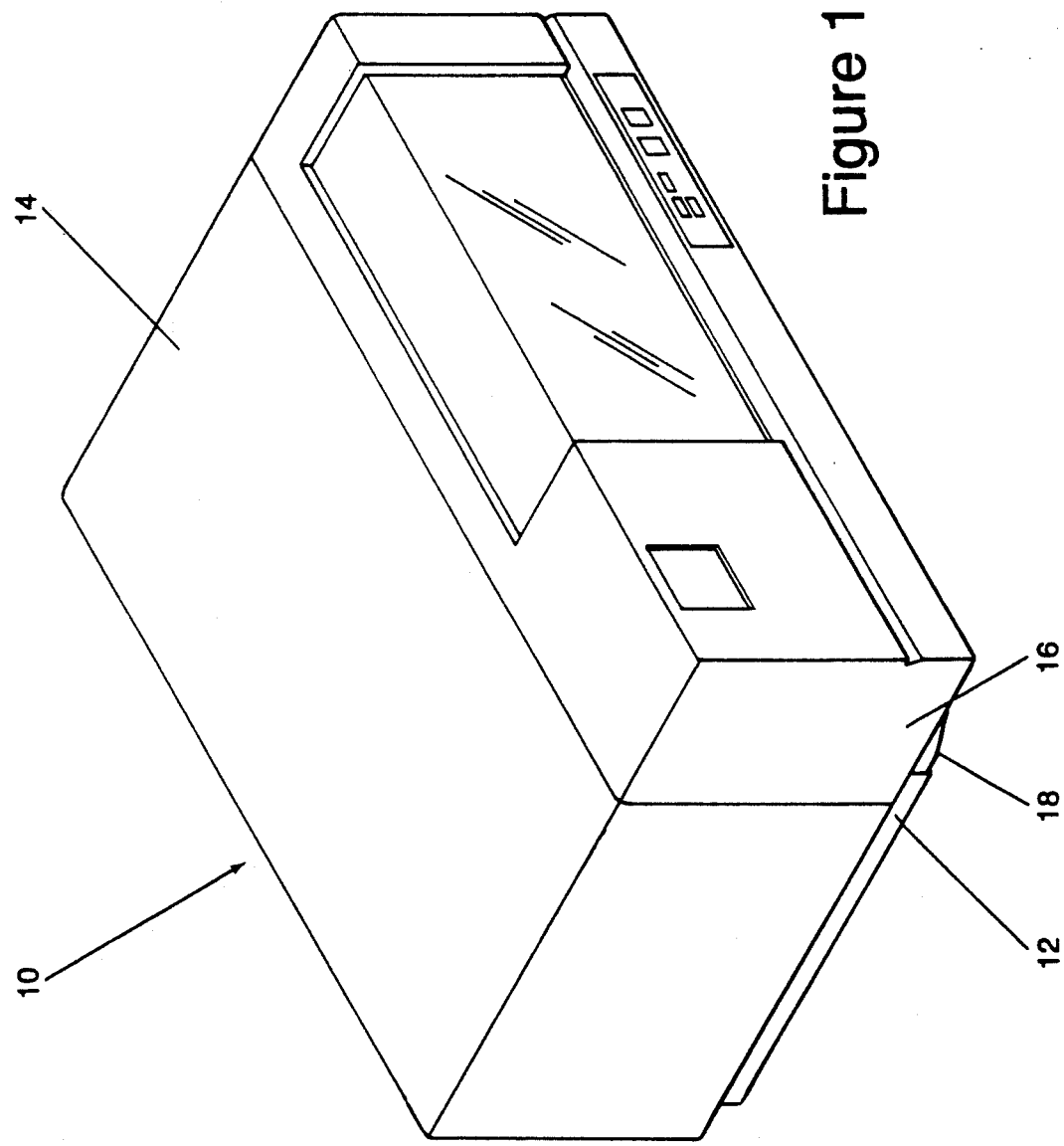
FIG. 1 is an isometric view of a storage unit embodying the present invention.
Figure 2:
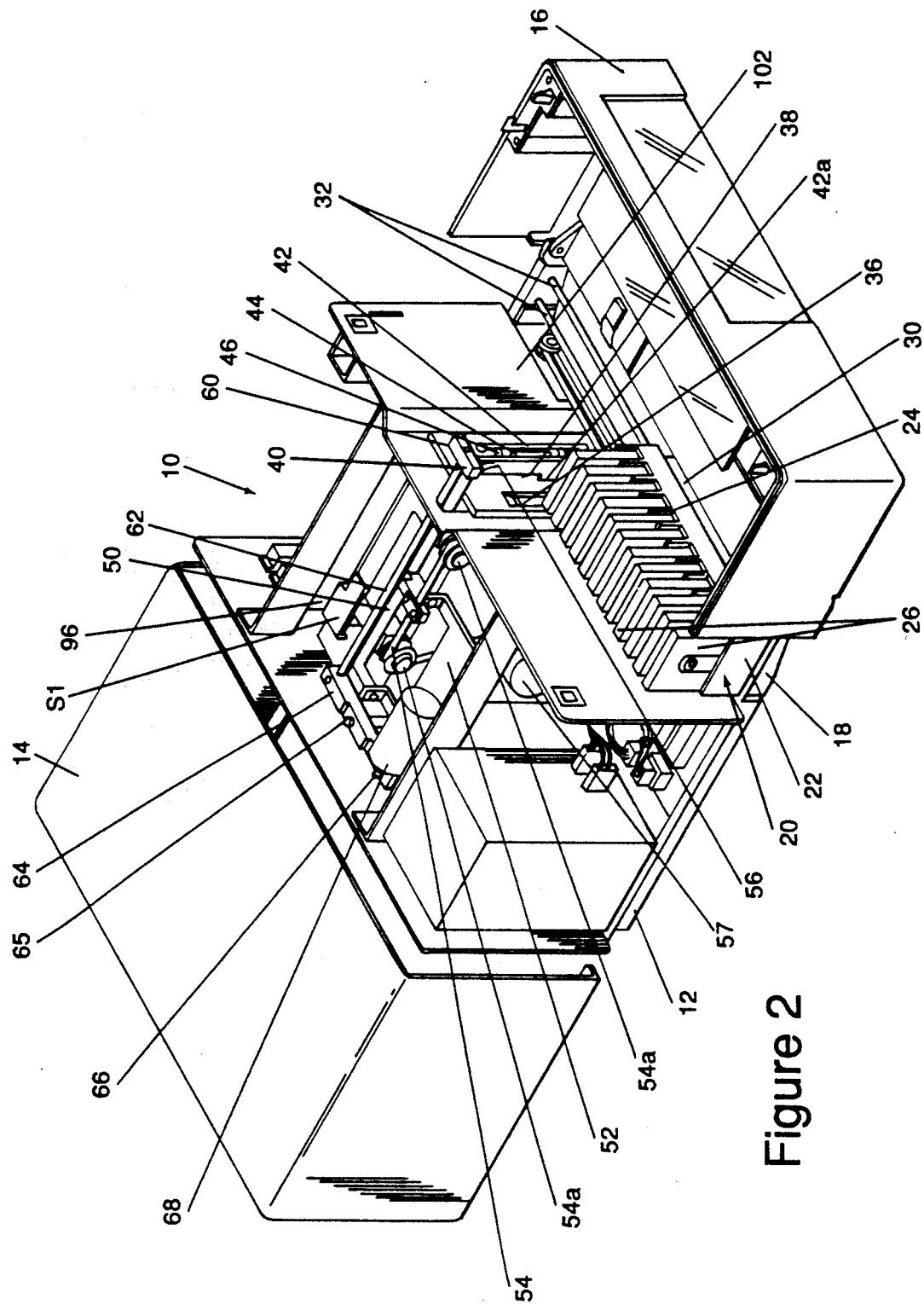
FIG. 2 is an isometric view of the storage unit of FIG. 1 shown removed from its case.

As shown in the drawings for purposes of illustration, the present invention is embodied in a random access storage unit, indicated generally by reference numeral 10, for storing computer files external of the computer system (not shown) with which used. The storage unit 10 includes a support frame 12 which is removably positioned within a case 14. A front cover 16 is pivotally attached to the frame at a forward end The storage unit 10 is shown with the frame 12 removed from the case 14 and with the front cover 16 pivoted into an open position in FIG. 2.

The storage unit 10 includes a magazine 20 having a base 22 with a row of twelve rearwardly open slots 24 each sized to receive a digital audio magnetic tape cassette 26. The storage unit 10 can use a cassette or group of cassettes to perform specific data backup functions, and use other cassettes for specific users, as desired.

Figure 3:
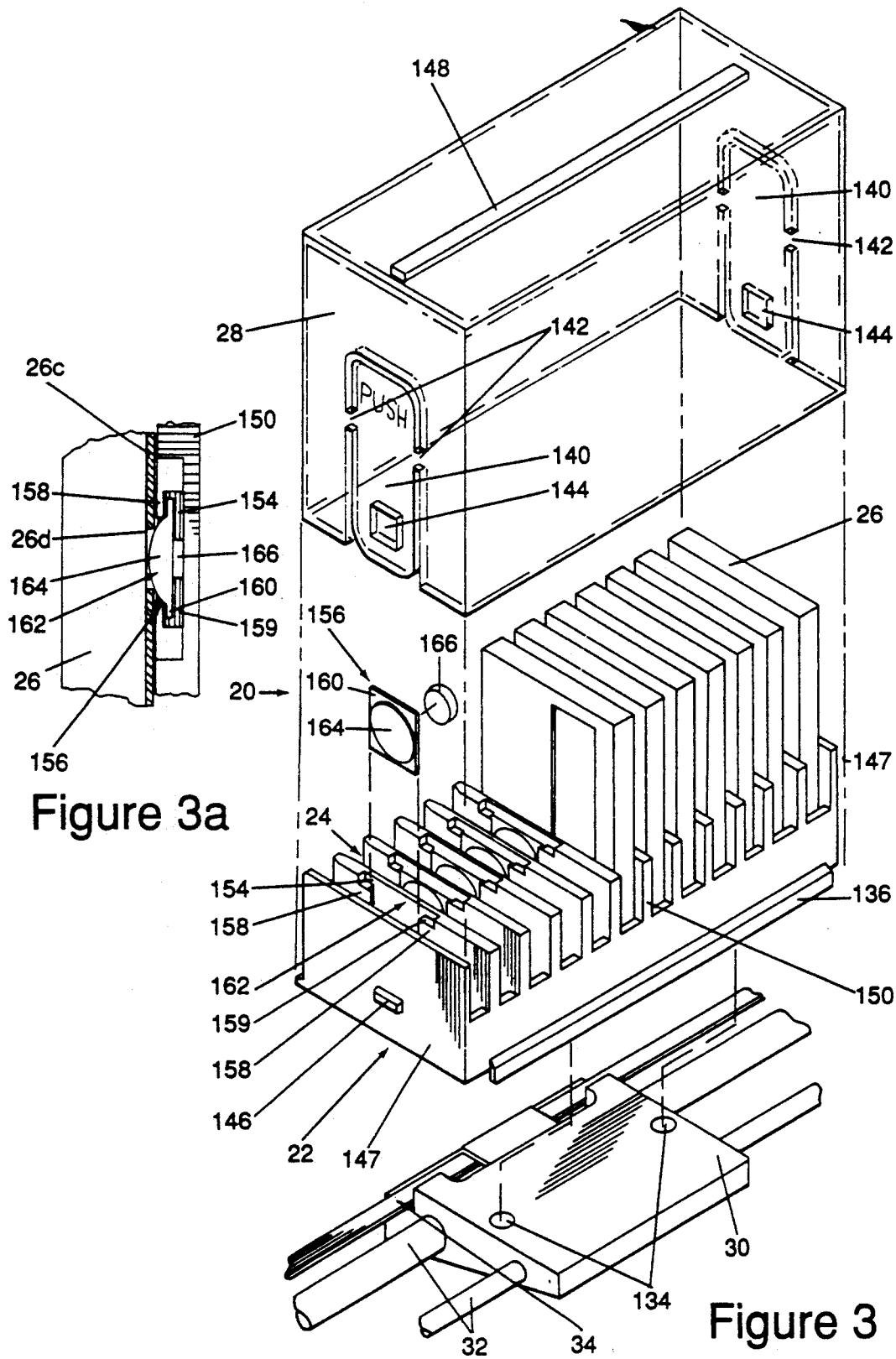
FIG. 3 is an enlarged isometric view of the cassette magazine shown in FIG. 2 carrying only seven cassettes with the magazine disconnected from the carriage and with its storage cover positioned above the magazine base.

As best shown in FIG. 3, a removable storage cover 28 can be attached to the base for storage. The magazine base 22 is removably attached to a carriage 30 which is slidably mounted on a pair of laterally extending guiderods 32. A motor-driven flexible drive belt 34 is attached to and selectively moves the carriage 30 laterally along the guide rods 32 to position a selected one of the cassette slots 24 in the magazine base 22, and hence the cassette 26 positioned therein in alignment with a tape-receiving opening 36 of a tape drive 38 mounted to the frame 12 for insertion of the cassette therein. The tape drive 38 has a conventional design compatible with the style and size of the cassette 26 being used. The cover 28 serves to protect the cassettes 26 in the magazine base 22 when stored, and is removed when the magazine base is mounted on the carriage 30.

As will be described in more detail below, the storage unit 10 includes a cassette handling mechanism 40 which is positioned and operates to insert and remove the selected cassette 26 into the opening 36 of the tape drive 38. The tape drive 38 includes reading and recording heads (not shown) positioned therein which are used to record computer files onto the cassette 26 inserted into the tape drive 38, and to read computer files previously recorded thereon for purposes of providing file storage external to the computer system with which the storage unit 10 is utilized.

The mechanism 40 serves to move the selected cassette 26 from the slot 24 where it is positioned in the magazine base 22 and to insert the cassette into the opening 36 of the tape drive 38 sufficiently far that the tape drive internal mechanism engages the cassette and pulls the cassette full within the tape drive in proper position with the tape drive heads. When the cassette is ready for ejection, the tape drive 38 partially ejects the cassette from the tape drive and the mechanism 40 completes the removal of the cassette and repositions the cassette in its slot 24 in the magazine base 22.

Figure 5:
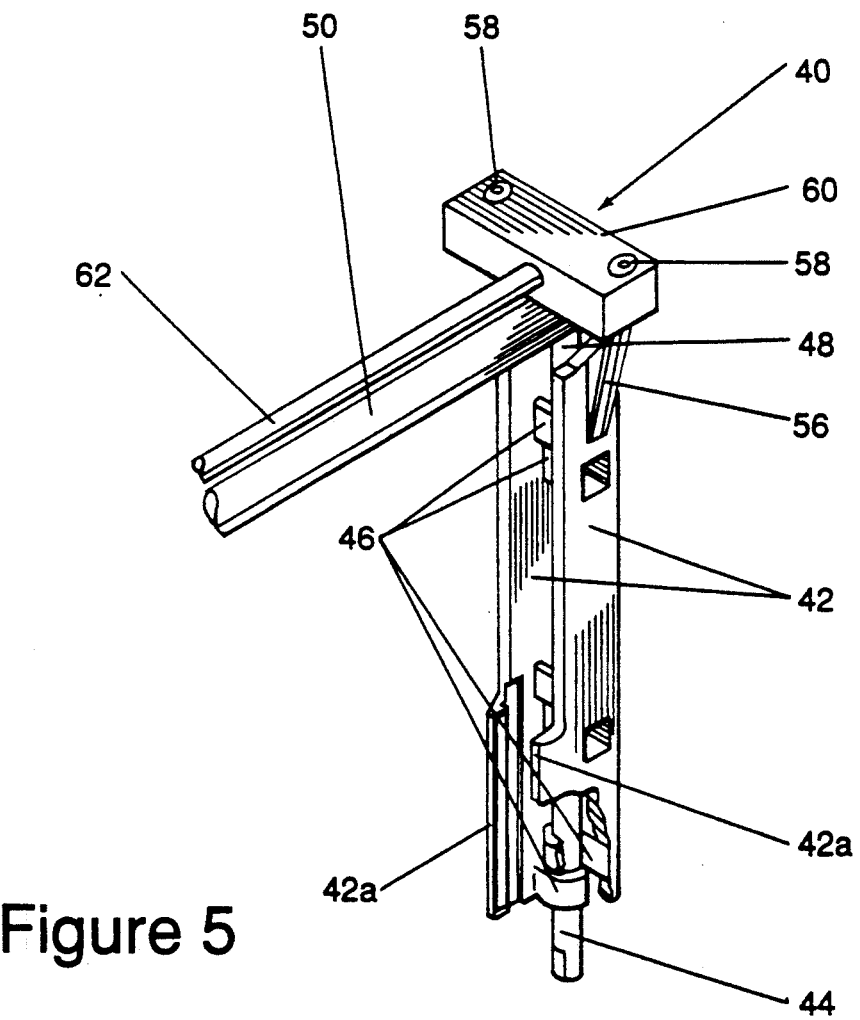
FIG. 5 is an enlarged fragmentary isometric view of the gripper arms used with the storage unit of FIG. 1 to handle the cassettes.
Figure 6:
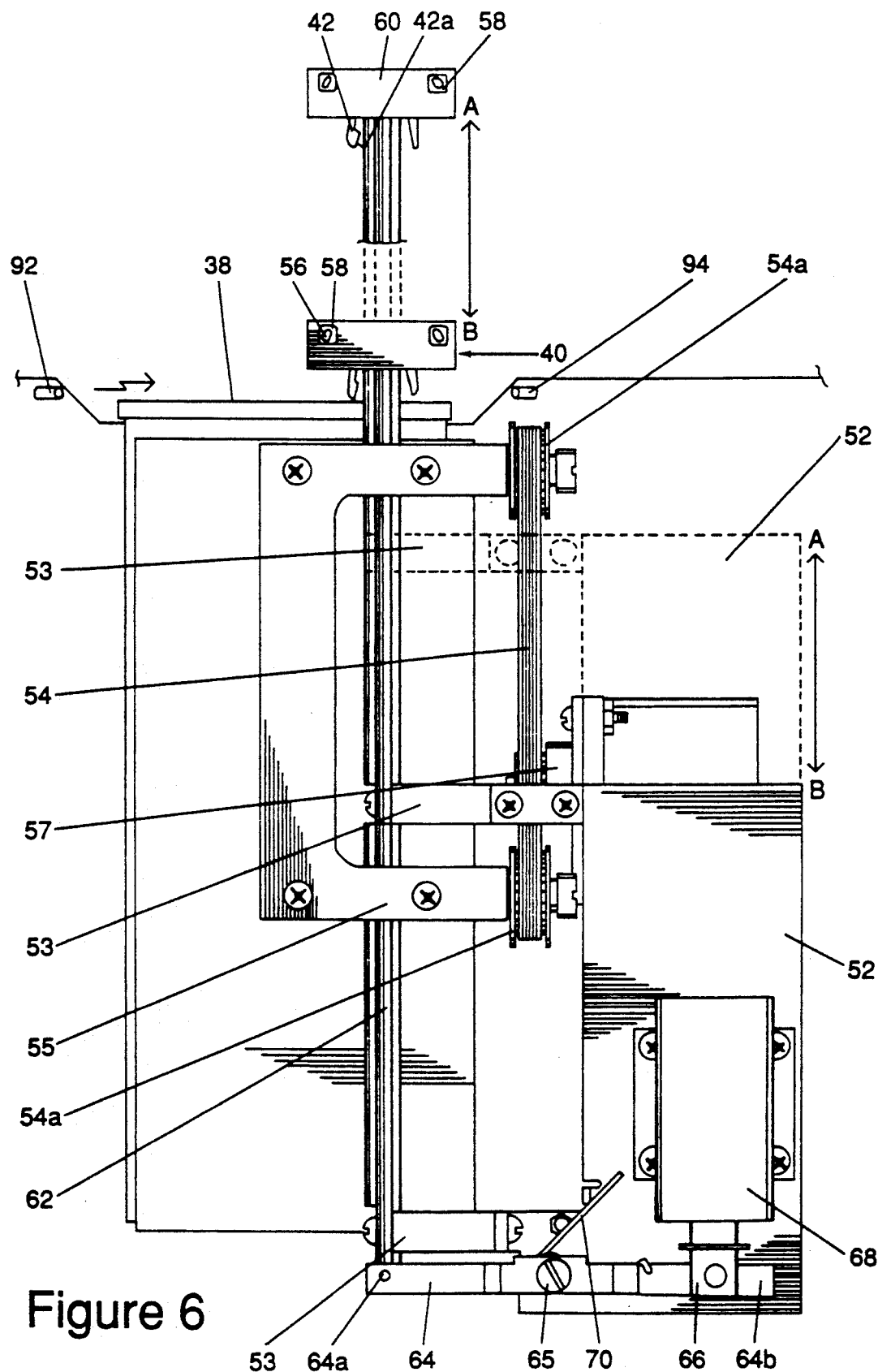
FIG. 6 is an enlarged top plan view of the storage unit of FIG. 1 without the case showing the gripper arms of FIG. 5 in a rearward position in solid line and in a forward position in broken line.

As best shown in FIG. 5, the mechanism 40 includes a pair of gripper arms 42 pivotally attached to a vertical pivot pin 44 extending between the arms. Each gripper arm 42 has three clevis 46 through which the pivot pin 44 projects. The gripper arms 42 also have three grooved guide blocks (not shown) which bear against the pivot pin and stabilize the arms as they rotate about the pivot pin 44. An upper end 48 of the pivot pin 44 is fixedly attached to a forward end of a movable support arm 50 which extends rearwardly from the pivot pin and has a rearward portion attached to a traveler 52 by a pair of brackets 53, as shown in FIG. 6.

The traveler 52 is attached to a motor-driven flexible drive belt 54 by a forward one of the brackets 53 to selectively move the traveler forward and rearward, and hence the gripper arms 42 attached to the traveler through the pivot pin 44 and the support arm 50. The drive belt 54 is entrained on a pair of pulleys 54a which are mounted to a stationary portion 55 of the frame 12. A stepper motor 57 supplies drive to the drive belt 54.

As will be described in greater detail below, the forward and rearward movement of the gripper arms 42 is used for insertion and removal of the cassettes 26. The traveler 52 is shown in FIG. 6 in broken line in the forward position with the gripper arms 42 at the position marked for the letter "A", and in solid line in the rearward position with the gripper arms at the position marked by the letter "B". The travel between positions A and B is sufficient to move a selected cassette 26 between its slot 24 in the magazine base 22 and the position within the tape drive 38 at which the tape drive engages the cassette upon insertion and to which the tape drive ejects the cassette upon ejection. A sensor S1 (see FIG. 2) is provided to detect when the traveler 52 has moved the gripper arms 52 to the fully forward position "A", and provides signals which control the operation of the stepper motor 57. The sensor S1 optically senses passage of a flag (not shown) which travels with the support arm 50 to determine when the traveler has moved the gripper arms 52 to the fully forward position.

Referring to FIG. 5 again, each of the gripper arms 42 has an elongated grasping member 42a along a lower lengthwise position thereof opposing the grasping member of the other gripper arm to facilitate grasping of a selected cassette 26 therebetween. As will be described below, the grasping members 42a also serve to push the cassette 26 during a portion of the insertion procedure.

Figures 7, 7A:
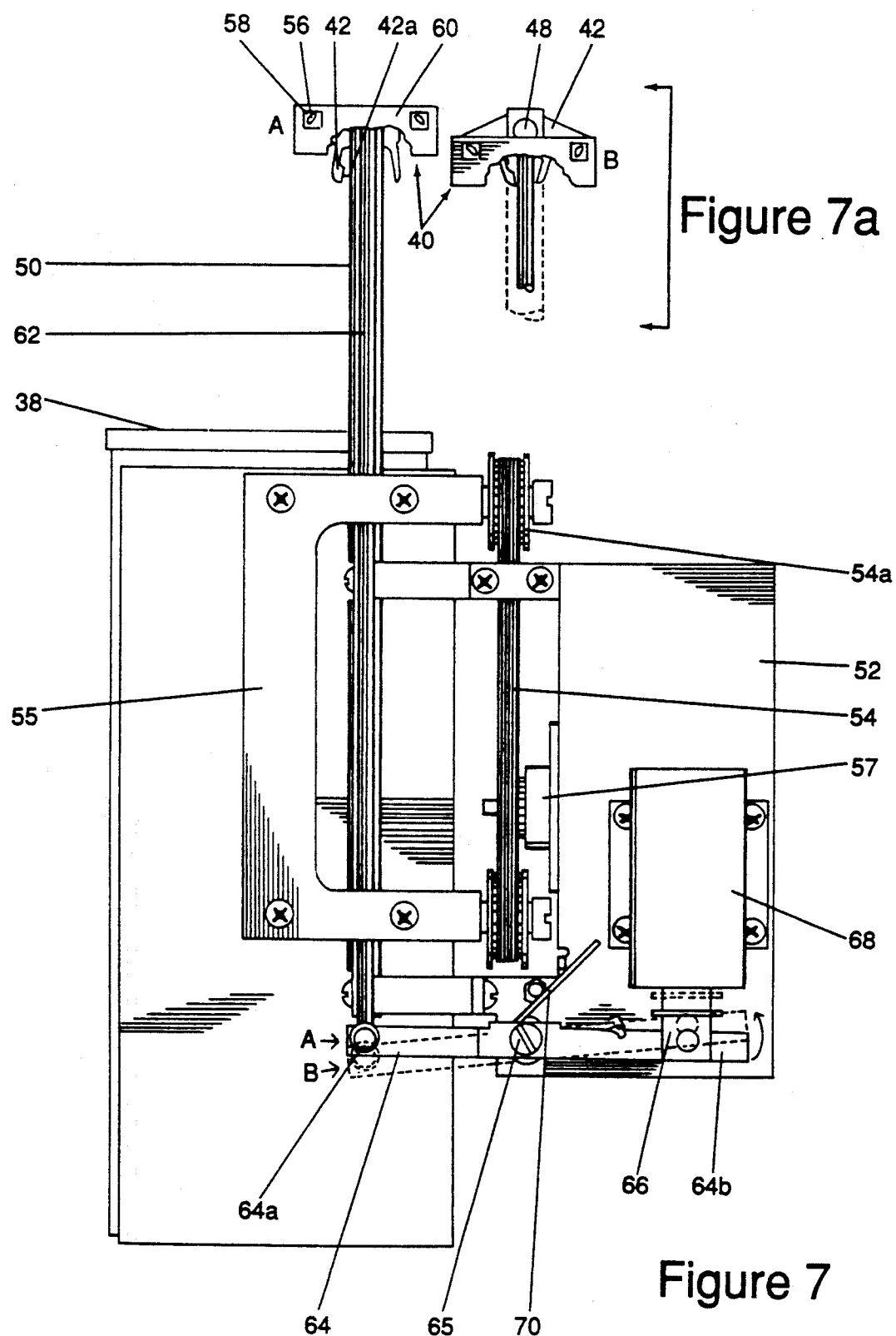
FIG. 7 is an enlarged top plan view of the storage unit of FIG. 1 without the case showing the gripper arms of FIG. 5 in an open position.
FIG. 7A is a fragmentary top plan view of the gripper arms of FIG. 7 showing the gripper arms in a closed position.

Each of the gripper arms 42 also has a lever 56 at an upper end portion thereof which projects upwardly and is rotatably received in a hole 58 in a head block 60 located above the forward end of the support arm 50. A control rod 62 has a forward end fixedly attached to the head block 60 and extends rearwardly from the head block, above the support arm 50, and has a rearward end pivotally attached to a first end 64a of an actuator arm 64, as shown in FIGS. 6 and 7. The actuator arm 64 is pivotally attached along its midportion to the traveler 52 by a pivot screw 65. A second end 64b of the actuator arm 64 is pivotally attached to a plunger 66 of a solenoid 68. The solenoid 68 is mounted to the traveler 52 for travel therewith.

By extension of the plunger 66 of the solenoid 68, the actuator arm 64 is rotated clockwise as viewed from above to the position shown in FIG. 7 in solid line and marked by the letter "A" which causes the gripper arms 42 to pivot into an opened position, also marked by the letter "A". When the plunger 66 of the solenoid 68 is retracted, the actuator arm 64 is rotated counterclockwise as viewed from above to the position shown in broken line in FIG. 7A and marked by the letter "B" which causes the gripper arms 42 to pivot into a closed position, also marked by the letter "B". The movement of the actuator arm 64 is transmitted through the control rod 62 to the gripper arms 42 and cause them to open and close by selective extension and retraction of the solenoid plunger 66. A spring 70 positioned about the pivot screw 65 to bias the actuator arm 64 to rotate clockwise and bias the solenoid plunger 66 into the extended position. The solenoid 68, the control rod 62 and the actuator arm 64 travel with the traveler 52, and the gripper arms 42 can be opened and closed at any time while the traveler moves forward or rearward under the drive provided by the drive belt 54.

The sequence of operation of the gripper arms 42 is illustrated in FIGS. 8A–8G. In FIGS. 8A through 8C, the selected cassette 26 is being inserted into the opening 36 of the tape drive 38 from its position in one of the slots 24 of the magazine base 22. In FIGS. 8D through 8G, the selected cassette 26 is being removed from the opening 36 of the tape drive 38 for return to its slot in the magazine base 22. For convenience of illustration, the magazine base 22 is nor illustrated.

In FIG. 8A, the gripper arms 42 are shown closed sufficiently to firmly grasp the selected cassette 26 and moving rearward to move the cassette toward the tape drive 38. As previously described, the opening and closing of the gripper arms 42 is accomplished by operation of the solenoid 68 which causes the control rod 62 to selectively move forward or rearward. The forward and rearward movement of the gripper arms is accomplished by the operation of the motor 54b to selectively move the traveler 52 and hence the support arm 50 attached thereto which supports the gripper arms forward and rearward.

To accommodate the unique shape of the digital audio tape cassette 26, the grasping member 42a of the one gripper arm 42 has a flat inner face 72, while the grasping member of the other gripper arm has an inwardly projecting member 74 with a smaller flat inner face 76. Each of the faces 72 and 76 has a friction pad 80 to improve grasping of the cassette 26. The face 72 of the one gripper arm 42 engages one side 26a of the cassette while the face 76 of the other gripper arm engages the other side 26b of the cassette which has a spring-loaded, sliding protective door 26c shown in FIG. 8A slid fully forward into the closed position. It is noted that the illustrated digital audio tape cassette 26 has a case portion 82 which projects outward beyond the side 26b of the cassette. The inwardly projecting member 74 of the one grasping member 54 projects inwardly beyond a recessed portion 86 of the gripper arm 42 sufficient so as not to engage the projecting case portion 82 of the cassette when grasping the cassette, as best illustrated in FIG. 8A.

Once the selected cassette 26 has been moved rearward most of the way toward the tape drive 38, but prior to the tape drive engaging the cassette and pulling it into engagement with the tape heads of the tape drive, the gripper arms 42 are fully opened to release the cassette 26, as illustrated in FIG. 8C. The gripper arms 42 are then moved forward away from the cassette 26 and closed sufficiently to engage a forwardly facing end wall 88 of the cassette, as illustrated in FIG. 8C. The gripper arms 42 are then moved rearward to push the cassette 26 sufficiently into the opening 36 of the tape drive 38 such that the tape drive will engage the cassette and move it into engagement with the tape heads. It is noted that this step of pushing the cassette 26 during the last portion of its rearward travel toward the tape drive 38 is necessary to achieve full insertion of the cassette into the tape drive opening 36. If an attempt was made to insert the cassette with the gripper arms 42 still grasping the cassette in the manner shown in FIG. 8A and without using the pushing step shown in FIG. 8C, the gripper arms would contact the front of the tape drive 38 before the cassette could be fully inserted. This would prevent full insertion of the cassette, since the tape drive opening 36 is barely larger than the cassette.

After the selected cassette 26 has been recorded by the tape drive 38 to create the desired backup copies of computer files, or the previously recorded computer files have been read, the tape drive 38 ejects the cassette using its conventional ejection mechanism. This causes the cassette 26 to move forward such that a portion of the cassette will project out of the opening 38 of the tape drive 36, but not far enough forward for the grasping members 54 to firmly grasp the cassette in the manner shown in FIG. 8A. Additionally, the protective cover door 26c of the cassette is not slid fully closed, thus it partially blocks the side 26b of the cassette which is grasped by the one gripper arm 42. As such, it is necessary for the gripper arms 42 to grasp the portion of the cassette that is projecting out of the opening 38 so that the cassette can be pulled out enough to permit the cover door 26c of the cassette to slide closed and expose the side 26b of the cassette for grasping by the face 76 of the one gripping arm and to generally permit the gripper arms to more firmly grasp the cassette. As illustrated in FIG. 8D, the face 76 of the one grasping member 42a frictionally engages the projecting case portion 82 of the cassette 26 and the face 72 of the other grasping member frictionally engages the side 26a of the cassette to pull the cassette part way out of the tape drive 38.

Once pulled out sufficiently that the cover door 26c of the cassette is closed to expose the side 26b of the cassette and the cassette sides 26a and 26b can be firmly grasped by the grasping members 42a, the gripper arms 42 are fully opened to release the cassette, as illustrated in FIG. 8E. Then, the gripper arms 42 are moved rearward and closed to firmly grasp the cassette as shown in FIG. 8F. Once firmly grasped, the gripper arms 42 are moved forward until the cassette 26 is returned to its slot 24 in the magazine base 22.

As shown in FIG. 8G, the gripper arms 42 are then fully opened to release the cassette, and moved further forward so that the carriage 30 is free to be moved laterally with the carriage 30 and the magazine base 22 mounted thereon to position another cassette at the tape drive 38 for insertion therein.

The use of this double-grip removal procedure described above has been found necessary when using 3.5 inch digital audio tape cassettes and currently existing tape drives designed therefor. With other existing tape drives using digital audio tape cassettes, the double-grip procedure is not necessary since the cassette is ejected sufficiently far forward by the tape drives that the grasping members 54 can firmly grasp the cassette upon ejection.

In accordance with another aspect of the invention, the storage unit 10 includes a light-emitting diode 92 that produces a light beam and a photodetector 94 that detects when the light beam has been broken. The light-emitting diode 92 and the photodetector 94 are shown schematically in FIG. 6 and provide a means by which, upon start-up of operation, the storage unit 10 can determine if cassettes are present in each of the slots 24 of the magazine base 22, and if not, which slots are empty. Before the storage unit 10 is operated, it first goes through a test cycle for missing cassettes by sequentially moving the carriage 30 to position each of the slots 24 in the magazine base 22 in alignment with the opening 36 of the tape drive 38. The gripper arms 42 are moved to grasp the cassette therein and move it rearward a sufficient test distance to break the light beam produced by the light-emitting diode 92. If the light beam is broken, that condition is detected by the photodetector 94 and an on-board microprocessor 96 contained within the storage unit 10 stores in an associated memory an indication that the tested magazine slot has a cassette positioned therein. Once the gripper arms 42 have been moved rearward the test distance necessary to break the light beam, the gripper arms are moved forward to the starting position, which repositions the cassette in the slot 24 from which it was taken. While the test distance is sufficient to cause the cassette to break the light beam, it is not so large as to cause the tape drive 38 to engage the cassette.

If during the test cycle the gripper arms 42 travel the full rearward test distance and return to the starting position without breaking the light beam, the microprocessor 96 stores in the memory an indication that the tested magazine slot contains no cassette. In such manner, after all slots 24 are tested, the storage unit 10 will know precisely which of the slots 24 contain cassettes and which do not.

The light beam is also used during normal operation of the storage unit 10 to detect when one of the cassettes 26 inserted into the tape drive opening 36 has been ejected so that the gripper arms 42 can be moved to pull the cassette out of the tape drive 38 and return it to a desired one of the slots 24 in the magazine base 22. The light beam is also used to detect if any of the cassettes 26 remains in position between the tape drive opening 36 and the magazine base 22 before the carriage 30 is moved, such as can occur if a cassette slips out from between the gripper arms 42 during transit. In such fashion, the damage to the storage unit 10 that might occur from moving the carriage 30 with a cassette lodged between the tape drive 38 and the magazine base 22 is avoided.

In accordance with yet another aspect of the invention, the storage unit 10 simultaneously runs a second test during the test cycle discussed above to detect if any cassettes are positioned backwards in the magazine base 22. As noted above, the carriage 30 is sequentially moved to position each of the slots 24 in alignment with the opening 36 of the tape drive 38. The gripper arms 42 grasp each cassette present in the slots 24 and move it rearward. The rearward test distance the cassettes are moved is preselected so that if the cassette 26 was in backwards in the magazine slot 24 the cassette will contact the tape drive 38 and further rearward movement will be prevented, thus causing the stepper motor 57 which moves the traveler 52 to slip. However, the rearward test distance the cassettes are moved is not so large that it will result in the tape drive 38 operatively engaging the cassette, which would require an ejection to subsequently occur. The number of steps the stepper motor 57 requires to move the cassette during the full rearward test distance is known in advance and stored in memory.

After the cassette 26 is moved or at least attempted to be moved the full rearward test distance, the gripper arms 42 then return the cassette to the magazine base 22 and the number of steps the stepper motor 57 operates to do so is counted. As discussed above, the sensor S1 is used to indicate when the gripper arms 42 have been moved to the fully forward position which positions the cassette in a desired one of the slots of the magazine base, and results in turning off the stepper motor 57. The number o-f steps counted to return the cassette to the magazine base 22 is compared to the known number of steps required for movement of a cassette the full rearward test distance. If the counted number of steps for removal is less than the number for the full rearward test distance, the cassette is presumed to have been positioned in the magazine base 22 backwards, since as noted above a backwards cassette will contact the tape drive 38 and thereby be prevented from moving the full rearward test distance. Since the stepper motor 57 will not drive the traveler 52 fully rearward, a smaller number of steps of the stepper motor 57 will be required to return the cassette to the magazine base 22.

Once the test cycle determines which slots 24 of the magazine base 22 have cassettes 26 present therein, and confirms that no cassettes are in backwards in the magazine base, the storage unit 10 is ready for normal operation. As described above, the gripper arms 42 are used to insert and remove cassettes from the tape drive 38 as needed to record computer files onto the cassettes, and to read the computer files previously recorded on the cassettes. In conventional manner, the storage unit 10 can be programmed for unattended operation, which makes the two tests conducted during the test cycle very important, since a human operator may not be present to determine which of the slots 24 have cassettes 26 therein and whether those cassettes are in backwards or not. The two tests prevent the storage unit 10 from commencing regular operation which will subsequently be interrupted when it discovers that cassettes are not present in the intended slots of the magazine base, or that one or more of the cassettes that are present therein are in backwards.

Figure 9:
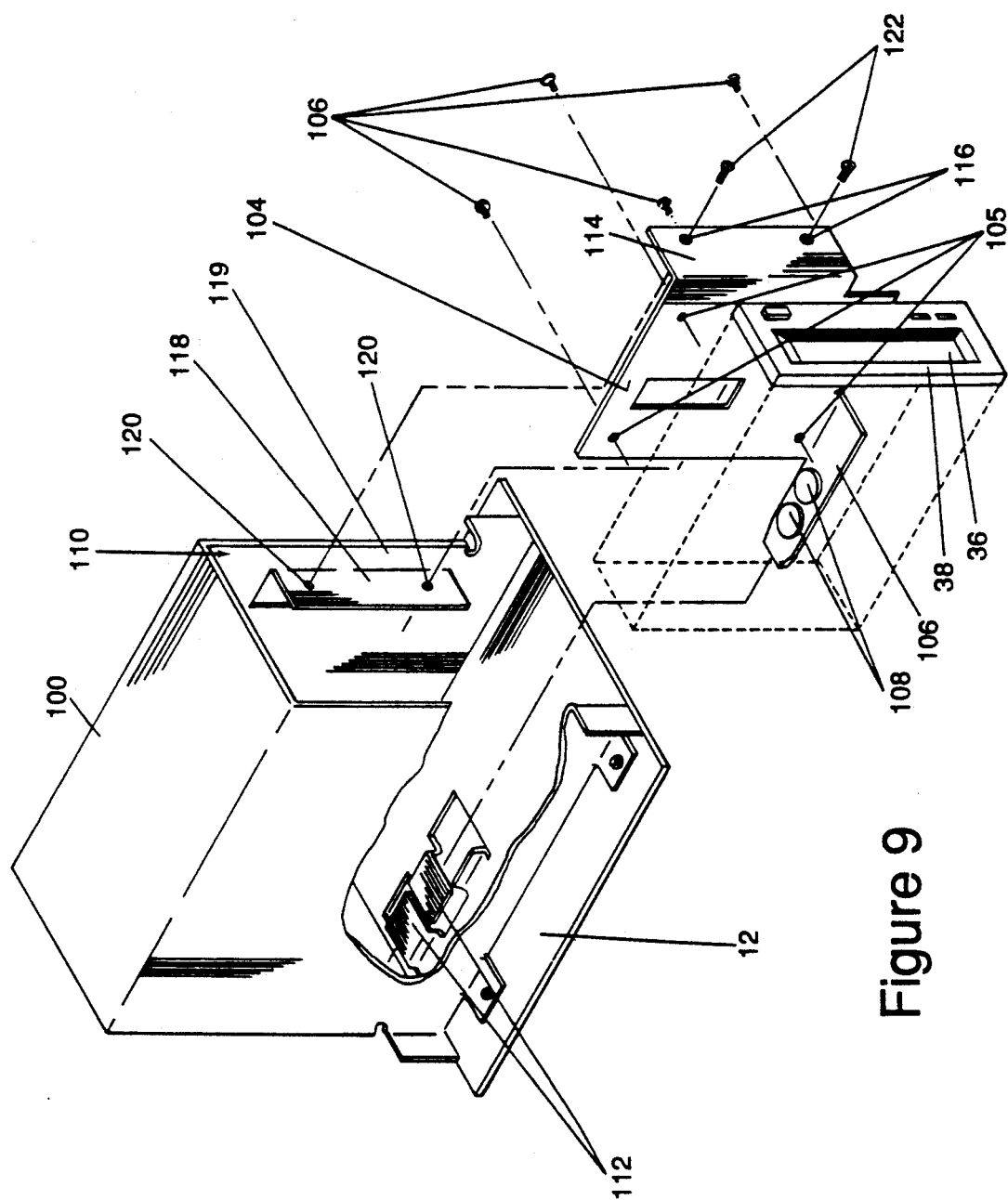
FIG. 9 shows an enlarged fragmentary exploded isometric view of the tape drive housing, the tape drive mounting bracket and the tape drive used in the storage unit of FIG. 1.

In accordance with still another aspect of the invention, the tape drive 38 is mounted in a manner to provide quick and easy removal and replacement. As best shown in FIG. 9, a housing 100 is fixedly attached to the support frame 12 rearward of a front panel 102 (see FIG. 2) which is visible when the front cover 16 is pivoted into the open position. As previously noted, the tape drive 38 may be any conventional tape drive compatible with the type of cassette 26 selected for the storage unit 10. To provide for easy removal and replacement of the tape drive 38 so that it can be accomplished by the user without having to disassemble the tape drive itself and without having to disassemble other components of the storage unit 10, the tape drive is removably mounted to a mounting bracket 104 having four holes 105 by four screws 106 using existing mating screw holes in the base of the tape drive. Further, the mounting bracket 104 has a flat arm 106 with a pair of protrusions 108. With the tape drive 38 mounted to the bracket 104, the tape drive is inserted into the housing 100 through a front opening 110 thereof. The arm 106 is slid under a pair of spring tabs 112 of the housing 100 which each bear against one of the protrusions 108 to removably hold the arm 106, and hence the bracket 104, securely in place. This helps eliminate movement of the tape drive 38 when it is mounted in the housing 100.

The bracket 104 further includes a forward alignment flange 114 with a pair of holes 116 therein. A mating flange 118 is fixedly attached to an inner wall 119 of the housing 100 and has a pair of holes 120 therein which precisely correspond in placement to the holes 116 of the alignment flange. The mounting bracket 104 is removably secured in position within the housing 100 by a pair of screws 122 which securely attach the alignment flange 114 to the mating flange 118.

In such manner, simply by releasing the two screws 122 and pulling the tape drive 38 from the housing 100, the tape drive can be removed from the storage unit 10 for replacement. The tape drive 38 is dismounted from the mounting bracket 104 simply by removing the four screws 106 and replaced with a new tape drive. Not only does this arrangement provide for a quick and easy removal and replacement of the tape drive 38, the tape drive is held securely within the housing 100 when installed, in proper alignment with the cassette handling mechanism 40. This alignment is achieved without requiring adjustment when the tape drive 38 is replaced, since the new tape drive will mount precisely in the place of the prior tape drive since the holes 116 and 120 in the flanges 114 and 118, respectively, are precisely positioned to provide the proper alignment with the cassette handling mechanism 40.

Figure 4:
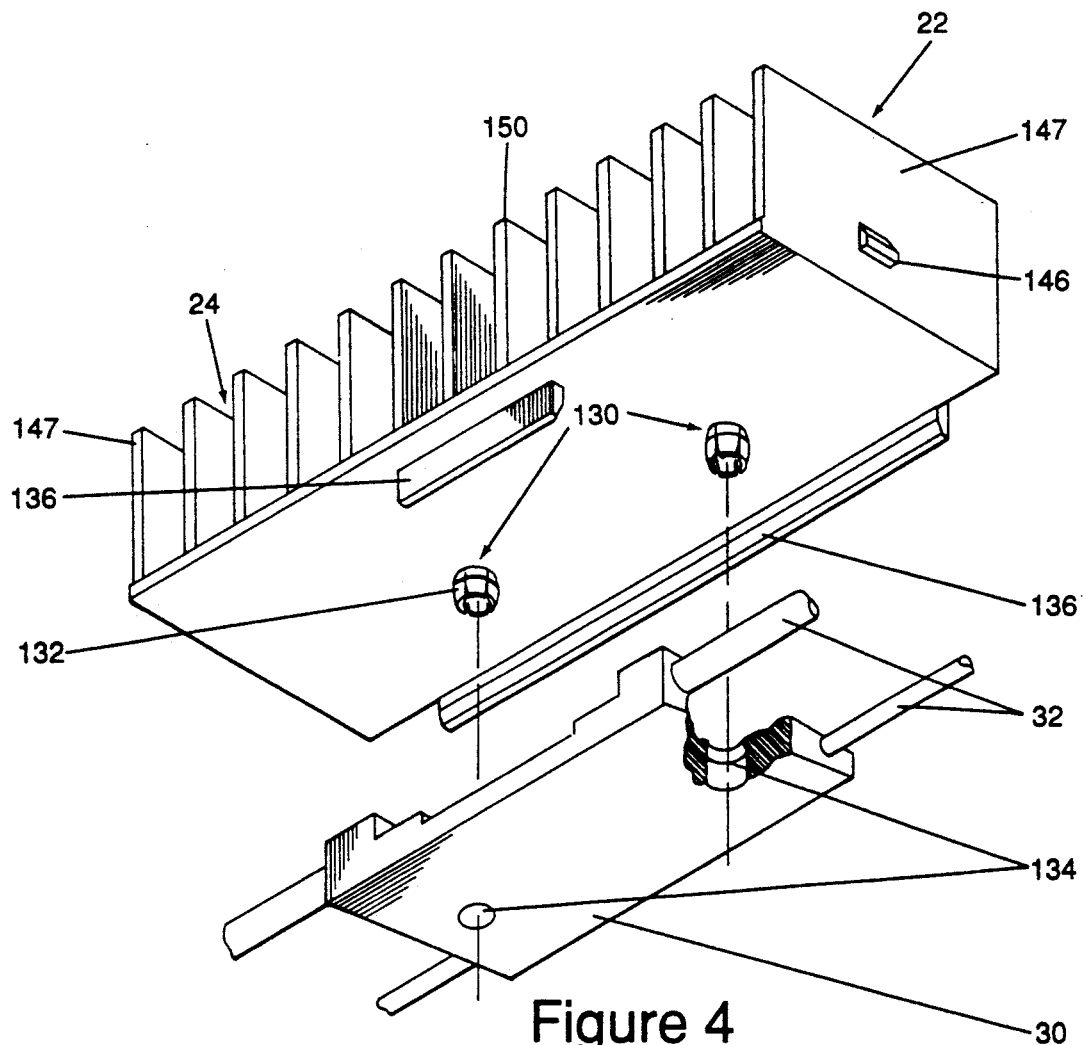
FIG. 4 is an enlarged isometric view of the cassette magazine of FIG. 3 shown from below with the magazine disconnected from the carriage and without the storage cover or any cassettes.
Figure 4A:
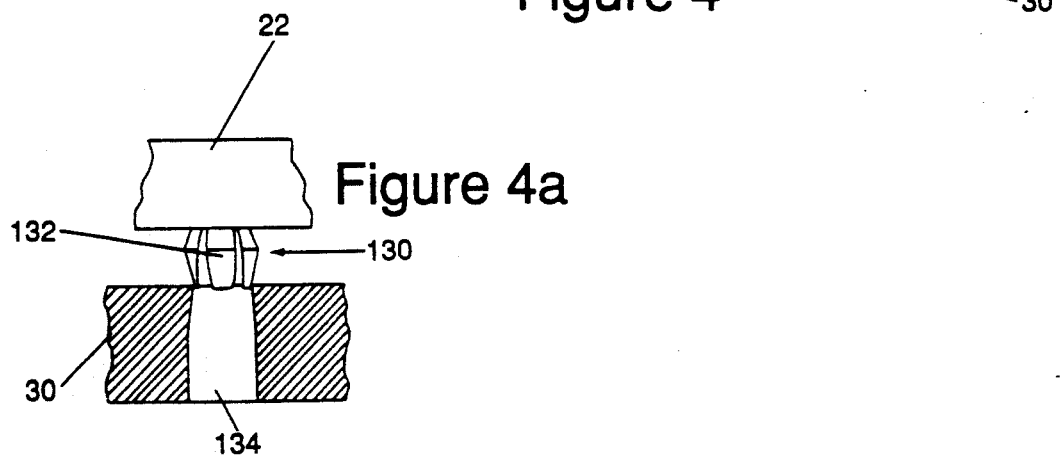
FIG. 4A is an enlarged fragmentary cross-sectional view of the connector of the magazine base being positioned for insertion in a reverse tapered hole in the carriage of FIG. 4.

As best shown in FIGS. 4 and 4A, the magazine base 22 is removably attached to the carriage 30 by a pair of connectors 130, each comprised of four resilient fingers 132 arranged in a circle. The carriage 30 has a pair of reverse tapered holes 134 which are sized to receive the connectors 130 and to cooperate with the resilient fingers 132 to provide a snap fit of the magazine base 22 to the carriage 30. In such fashion, the magazine base 22 is securely, but yet removably, attached to the carriage 30 for movement therewith during operation of the storage unit.

The present invention makes it unnecessary to provide a direct connection of the drive mechanism (i.e., the drive belt 34) to the magazine base 22 for movement of the cassettes 26. Further, the present invention allows for quick and easy disconnection of the magazine base 22 from the storage unit 10 for storage disconnected from the storage unit and for easy interchangeability when using several magazines with the storage unit. The removable magazine 20 allows for long-term archiving and off-site safety storage of data on the cassettes 26 protected from physical damage by the magazine base 22 and storage cover 28. With the present invention, the entire magazine 20 can be conveniently removed and stored with the twelve cassettes 26 therein.

As shown in FIG. 4, the magazine base 22 includes a pair of guide bars 136 which assist in positioning the magazine base relative to the carriage 30 for insertion of the connectors 130 into the reverse tapered holes 134. In addition to serving as guides, the bars 136 serve as support legs when the magazine base 22 is removed from the carriage 30 and placed on a flat surface. The guide bars 136 extend sufficiently along the length of the magazine base 22 and project sufficiently downward below the connectors 130 to provide a stable support which raises the underside of the magazine base 22 sufficiently above the flat surface that the connectors 130 will not engage the flat surface and thereby be damaged.

The magazine storage cover 28 shown in FIG. 3 has a latch 140 molded into each end as an integral part thereof. Each latch 140 is molded to be separate from the end wall of the cover 28, except for two narrow hinge portions 142. The hinge portions 142 serve as torsion spring members, which return the latch 140 to its original upright position when pivoted around the hinge members 142 for attachment of the storage cover 28 to the magazine base 22 or removal of the storage cover.

A lower portion of each latch 140 has an aperture 144 which is positioned to receive therein a projection 146 molded as part of each end wall 147 of the magazine base 22 when the storage cover 28 is in position on the magazine base for storage of the magazine 20. The spring action of the hinge portions 142 securely hold the latches 140 in a locked position with the projections 146 of the end walls 147 within the aperture 144. To remove the storage cover 28 from the magazine base 22, the user presses an upper portion of each latch 140 above the hinge members 142 to pivot the lower portion thereof outward and clear of the projection 146.

A resilient foam strip 148 is glued to the inside a top portion of the storage cover 28 and has sufficient thickness to engage the cassettes 26 and help hold the cassettes 26 securely in the magazine base 22 and prevent their movement during handling when the storage cover is installed on the magazine base 22. The foam strip 148 extends along the length of the cover sufficient to engage all cassettes in the slots 24. The latches 140 and the foam strip 148 hold the storage cover 28 in place on the magazine base 22 with the cassettes 26 therein so securely that the magazine 20 may be dropped without dislodging the storage cover from the base. The storage cover 28 not only protects the cassettes 26 from physical damage, but also protects them from dust and moisture.

Typically, the magazine base 22 has the storage cover 28 attached thereto when the magazine 20 base is being handled for connection to or removal from the carriage 30 and for storage disconnected from the carriage. Of course, after the magazine base 22 has been connected to the carriage 30, the storage cover 28 must be removed before commencing operation of the storage unit 10.

The storage unit 10 has been illustrated in the drawings for operation in a horizontal position. It is noted, however, that the storage unit 10 may be operated with the unit oriented vertically and resting on one side. For vertical operation, and also to provide secure, but yet removable, positioning of the cassettes 26 within the slots 24 of the magazine base 22 even during horizontal operation, the magazine base includes means for removably holding the cassettes in position. The magazine base 22 has eleven divider walls 150 equally spaced between the two end walls 147, to define the slots 24 in the magazine base, as shown in FIG. 3. Each of the divider walls 150 and one of the end walls 147 has a recess 154 molded therein and sized to receive a button plate 156, as best shown in FIG. 3. The recess 154 has a pair of projecting wall portions 158 which extend along the recess and define a pair of grooves 159 which receive opposing edge portions 160 of the button plate 156. The wall portions 158 of each recess 154 are spaced apart to define an opening 162 to the adjacent cassette slot 24. A button 164 of the button plate 156 positioned in the recess 154 projects outward through the opening 162 to engage a circular aperture 26d (see FIG. 3A) in the cover door 26c of the cassette 26 positioned within the slot.

The aperture 26d in the cover door 26c is provided in a conventional cassette 26 so that when the cover door is moved to the open position, the hubs of the cassette tape reels will be accessible through the apertures so the tape drive 38 can provide drive to the tape within the cassette. The present invention utilizes this already-existing aperture 26d by biasing the button plate 156 outward so as to press the button 164 into the aperture in the cover door 26c of the cassette and thereby act as a detent to removably retain the cassette within the slot 24. The button plate 156 is biased outward using a circular piece of closed-cell foam 166 positioned between the back of the button plate 156 and an interior face of the divider wall 150 or end wall 147 defining the recess 154. The foam 166 is glued to the wall to hold it in position and expands into a recess formed on the rear side of the button 164. The foam 166 holds the button plate 156 in position without the need to be glued to the button plate.

With the use of button plates 156, the cassettes 26 do not wobble about or fall out of the magazine base 22 during movement of the carriage 30, whether the storage unit 10 is operated horizontally or vertically, or during storage when the magazine 20 is removed from the storage unit. While the button plates 156 securely hold the cassettes 26 in position within the slots 24, a cassette can be easily removed when desired by the gripper arms 42 by pushing on the cassette with sufficient force to compress the foam 166 and move the button plate 156 laterally further into the recess 154.

It will be appreciated that, although a specific embodiment of the invention has been described herein for purposes of illustration, various modifications may be made without departing from the spirit and scope of the invention. Accordingly, the invention is not limited except by the appended claims.

I claim:

1. A computer storage unit usable with tape cassettes, comprising:

a tape drive having an opening to receive one of the tape cassettes;

a carriage;

a carriage drive providing drive to said carriage to selectively move said carriage laterally relative to said tape drive opening;

a magazine having a plurality of slots, each said magazine slot being sized to releasably hold one of the cassettes and having an open side positionable toward said tape drive opening, said magazine being releasably attachable to said carriage for travel therewith with said open sides of said magazine slots positioned toward said tape drive opening, said carriage drive being operable to move said carriage laterally to position a selected one of said magazine slots at said tape drive opening and hold said magazine slot in generally planar alignment with said tape drive opening for selected movement of one of the cassettes between said selected magazine slot and said tape drive opening;

a pair of gripper arms rotatable between a grasping position with said gripper arms closed sufficiently to grasp one of the cassettes, a pushing position with said gripper arms closed sufficiently to engage and push against one of the cassettes, and an open position with said gripper arms open sufficiently to receive one of the cassettes therebetween and release the cassette if grasped therein;

a traveler having said gripper arms attached for travel therewith;

a traveler drive providing drive to said traveler to selectively move said traveler so as to move said gripper arms attached thereto between said selected magazine slot and said tape drive opening;

an actuator mounted to said traveler for travel therewith, said actuator selectively rotating said gripper arms between said grasping position to grasp one of the cassettes, said pushing position to push one of the cassettes toward said tape drive opening, and said open position in preparation for grasping one of the cassettes or to release the cassette if grasped therein; and a controller controlling operation of said actuator and said traveler drive to selectively rotate and move said gripper arms to move selected ones of the cassettes in said magazine slots into said tape drive opening and remove the cassette therein from said tape drive opening and return the cassette to a desired one of said magazine slots.

2. The storage unit of claim 1 wherein said controller selectively controls said actuator and said traveler drive to position said gripper arms at said selected magazine slot to grasp the cassette therein, and then to move said gripper arms with the cassette grasped therein toward said tape drive opening and upon partial insertion therein prior to engagement by said tape drive to release the cassette, and then to rotate said gripper arms into said pushing position and push the cassette sufficiently far into said tape drive opening for engagement by said tape drive, and also to move said traveler to position said gripper arms at said tape drive opening to grasp the cassette therein when ejected by said tape drive, and then to move said gripper arms with the cassette grasped therebetween toward said selected magazine slot and upon return of the cassette to said selected magazine slot to release the cassette, whereby the cassette can be pushed into said tape drive opening by said gripper arms while in said pushing position farther than achievable with said gripper arms grasping the cassette while in said grasping position.

3. The storage unit of claim 2 for use with digital audio tape cassettes having a movable cover door which is in the open position when the cassette is within said tape drive and a closed position when the cassette is sufficiently withdrawn from said tape drive and having a fixed portion exposed when the cassette is ejected from said tape drive, wherein said controller selectively controls said actuator and said traveler drive to initially grasp the cassette by the fixed portion of the cassette when ejected, then to move said gripper arms with the cassette grasped therebetween by the fixed portion toward said selected magazine slot until the movable cassette cover door returns to the closed position, then to release the cassette and grasp the cassette by the closed cover door of the cassette, and then to move said gripper arms with the cassette grasped therebetween by the closed cover door toward said selected magazine slot and upon return of the cassette to said selected magazine slot to release the cassette.

4. The storage unit of claim wherein said traveler includes a pivot pin, and said gripper arms are rotatably mounted on said pivot pin for rotation thereabout for movement between said grasping, pushing and open positions.

5. The storage unit of claim 4 wherein said actuator includes an actuator arm selectively linearly movable relative to said traveler and a head block fixedly attached to said actuator arm, and wherein each of said gripper arms is loosely connected to said head block at a position offset from said pivot pin such that linear movement of said actuator arm in one direction moves said head block to cause rotation of said gripper arms about said pivot pin to open said gripper arms and linear movement of said actuator arm in an opposite direction moves said head block to cause rotation of said gripper arms about said pivot pin to close said gripper arms.

6. The storage unit of claim 5 wherein said gripper arms each include a lever rigidly attached thereto and rotatably received in an opening in said head block to provide said loose connection of said gripper arms to said head block to rotate said gripper arms about said pivot pin in response to linear movement of said actuator arm.

7. The storage unit of claim 5 wherein said actuator further includes a solenoid which selectively moves said actuator arm in a selected linear direction.

8. The storage unit of claim wherein said traveler is positioned above said tape drive and has a platform which is movable between a position rearward of said tape drive to a position forward thereof generally over said tape drive, and wherein said traveler further includes a forward reaching arm with a rearward end portion rigidly attached to said platform and a forward end portion to which said gripper arms are rotatably attached, selective movement of said platform between said rearward and forward positions moving said gripper arms between said selected magazine slot and said tape drive opening.

9. The storage unit of claim 8 wherein said traveler arm has at said forward end portion a downwardly extending pivot pin fixedly attached thereto, and said gripper arms are rotatably mounted on said pivot pin for rotation thereabout for movement between said grasping, pushing and open positions.

10. The storage unit of claim 9 wherein said actuator includes a forward reaching actuator arm in general alignment with said traveler arm, said actuator arm having a rearward end portion connected to an actuator member that selectively linearly moves said actuator arm forwardly and rearwardly relative to said traveler and a forward end portion with a head block fixedly attached thereto, and wherein each of said gripper arms is connected to said head block at a position offset from said pivot pin such that linear movement of said actuator arm in one of said forward or rearward directions moves said head block to cause rotation of said gripper arms about said pivot pin to open said gripper arms and linear movement of said actuator arm in the opposite direction moves said head block to cause rotation of said gripper arms about said pivot pin to close said gripper arms.

11. The storage unit of claim wherein said gripper arms each include a lever rigidly attached thereto and rotatably received in an opening in said head block to provide said connection of said gripper arms to said head block to rotate said gripper arms about said pivot pin in response to linear movement of said actuator arm.

12. The storage unit of claim 10 wherein said actuator member includes a solenoid which selectively moves said actuator arm in said forward and rearward directions.

13. The storage unit of claim 12 wherein said solenoid is connected to one end of a pivot arm and the other end of said pivot arm is connected to said rearward end portion of said actuator arm, said pivot arm being pivotally mounted between its ends to said platform, operation of said solenoid selectively pivoting said pivot arm in one rotational direction to move said actuator arm in the forward direction and in the opposite rotational direction to move said actuator arm in the rearward direction.

14. The storage unit of claim wherein said gripper arms each include an elongated grasping member extending along a lower edgewise portion of said gripper arm and projecting toward said tape drive opening for grasping and pushing of the cassettes.

15. The storage unit of claim 14 for use with digital audio tape cassettes having a protruding fixed portion exposed when the cassette is ejected from said tape drive, wherein said grasping member of one of said gripper arms has a face portion facing generally toward the other of said grasping members, sized to engage the protruding fixed portion of the cassette and frictionally grasp the cassette when being initially removed from said tape drive opening.

16. The storage unit of claim 1 further including a light source generating a beam of light and a light detector detecting when said beam is broken and, when broken, generating a broken beam signal, said light source and detector being positioned such that said beam projects across said tape drive opening, and wherein said controller controls operation of said actuator and said traveler drive during a test cycle to selectively rotate and move said gripper arms to sequentially move from each of said magazine slots any cassette therein toward said tape drive opening sufficient to break said beam, said controller determining the presence or absence of a cassette in each of said magazine slots based upon whether or not said broken beam signal is generated when said gripper arms are moved toward said tape drive opening sufficient to break said beam if a cassette were in the particular one of said magazine slots at which said gripper arms are positioned.

17. The storage unit of claim 1 for use with cassettes that cannot be fully inserted into said tape drive opening if inserted backwards, wherein said traveler drive includes a stepper motor, and said controller controls operation of said actuator and said traveler drive during a test cycle to selectively rotate and move said gripper arms to sequentially move the cassette from each of said magazine slots having one therein toward said tape drive opening a preselected distance, said controller including a counter to count the steps said stepper motor operates when attempting to move the cassette said preselected distance and a comparator to compare said counted steps for each cassette to a predetermined number of steps required to move a cassette said preselected distance if correctly positioned in said magazine slot, said controller generating an error signal indicating a difference in said counted steps and said predetermined steps if such occurs to thereby indicate a cassette is in backwards in said magazine slot.

18. The storage unit of claim 1 further including a detector detecting when one of the cassettes has been moved a preselected distance toward said tape drive opening and generating a detection signal, and wherein said controller controls operation of said actuator and said traveler drive during a test cycle to selectively rotate and move said gripper arms to sequentially move from each of said magazine slots any cassette therein toward said tape drive opening sufficient to be detected by said detector, said controller determining the presence or absence of a cassette in each of said magazine slots based upon whether or not said detector signal is generated when said gripper arms are moved toward said tape drive opening sufficient for a cassette to be moved said preselected distance if a cassette were in the particular one of said magazine slots at which said gripper arms are positioned.

19. The storage unit of claim 18 for use with cassettes that cannot be fully inserted into said tape drive opening if inserted backwards as a result of blocking contact with said tape drive, wherein said traveler drive includes a stepper motor, and wherein said preselected distance is selected sufficiently large to allow a cassette in backwards in said magazine slot to be moved into blocking contact with said tape drive so as to thereby inhibit further movement thereof toward said tape drive, such that upon contact with said tape drive said stepper motor will be unable to further move the cassette toward said tape drive opening and slip one or more steps, but said preselected distance is selected sufficiently small to not fully insert a cassette correctly positioned in said magazine slot into said tape drive opening for operative engagement with said tape drive, said controller including a counter to count the steps said stepper motor operates when attempting to move the cassette said preselected distance and a comparator to compare said counted steps for each cassette to a predetermined number of steps required to move a cassette said preselected distance if correctly positioned in said magazine slot, said controller generating an error signal indicating a difference in said counted steps and said predetermined steps if such occurs to thereby indicate a cassette is in backwards in said magazine slot.

20. The storage unit of claim 1 further including a detector detecting when one of the cassettes is in a position between said magazine and said tape drive, not fully in one of said magazine slots or fully in said tape drive, and generating a detector signal, said detector being positioned at said tape drive opening, and wherein said controller inhibits operation of said carriage drive in response to said detector signal, whereby movement of said carriage is prevented if a cassette is improperly positioned to avoid damage to the storage unit.

21. The storage unit of claim 1 further including a detector detecting when one of the cassettes is in a position to which ejected by said tape drive, and generating a detector signal, said detector being positioned at said tape drive opening, and wherein said controller controls operation of said actuator and said traveler drive to selectively rotate and move said gripper arms to remove the ejected cassette from said tape drive and move the ejected cassette to a selected one of said magazine slots.

22. The storage unit of claim 1 wherein said tape drive is removably mounted within a stationary housing using a mounting bracket to which said tape drive is removably mounted, said housing having a mounting flange with mounting apertures therein and said mounting bracket having an alignment flange with mounting apertures therein, said alignment flange apertures precisely corresponding in position to said mounting flange apertures, said mounting flange and said alignment flange being positionable abutting one another to secure said tape drive within said housing during operation of the storage unit, the storage unit further including a plurality of removable fasteners which pass through said mounting flange apertures and said alignment flange apertures to detachably hold said mounting flange and alignment flange securely together and said tape drive in precise alignment during operation of the storage unit, yet allow easy and quick removal of the tape drive from said housing for repair or replacement.

23. The storage unit of claim 22 wherein said mounting bracket further includes a support arm rigidly attached thereto which is removably insertable into a receiver in said housing as said tape drive is moved into position within said housing, said support arm providing support against movement between said housing and said tape drive during operation of the storage unit.

24. The storage unit of claim 1 wherein said magazine has a first connector and said carriage has a mating second connector, said first and second connectors being connected together during operation of the storage unit to securely hold said magazine against movement relative to said carriage and selectively disconnectable for storage of said magazine separated from said carriage.

25. The storage unit of claim 24 wherein said first connector includes a plurality of resilient fingers projecting downward from a bottom side of said magazine located toward said carriage and said second connector includes a recess in said carriage sized and shaped such that said resilient fingers releasably snap fit into said carriage recess.

26. The storage unit of claim 25 wherein said recess is a reversed tapered hole in said carriage having a smaller diameter opening toward said magazine and a larger diameter opening away from said magazine to define a catch wall portion therebetween, and wherein said fingers have a length to extend into said hole when said magazine is positioned on said carriage and have an enlarged distal end sized to pass through said smaller diameter opening upon movement of said fingers together to present a reduced cross-section and to move outward when within said larger diameter opening with said enlarged distal ends engaging said catch wall portion of said hole to securely, but releasably, hold said magazine to said carriage.

27. The storage unit of claim 25 wherein said magazine has legs projecting downward from said bottom side of said magazine beyond said resilient fingers to provide a stable support for said magazine when removed from said carriage and placed with said legs downward on a flat surface, said magazine legs having sufficient length to hold said resilient fingers out of contact with the flat surface.

28. The storage unit of claim 27 wherein said magazine legs are arranged relative to said carriage to serve as guides to align said magazine resilient fingers with respect to said carriage recess when attaching said magazine to said carriage.

29. The storage unit of claim wherein said magazine includes a magazine base having said magazine slots and a detachable cover, said base having a protrusion at each end and said cover having a rotatable latch at each end with an aperture therein to receive one of said protrusions of said base, each said latch being rotatable between a lock position receiving one of said protrusions in said latch aperture to securely attach said cover to said base and a release position with said latch moved clear of said protrusion to allow removal of said cover from said base.

30. The storage unit of claim 29 wherein each of said latches has a spring biasing said latch into said lock position.

31. The storage unit of claim 30 wherein said latches and said springs are formed integral with one or the other of a pair of end walls of said cover, each of said latches being positioned in an aperture in one of said cover end walls defined by an edge portion of said cover, each of said springs comprising a pair of torsion spring arms aligned along a latch hinge line and connecting opposing edge portions of said latch with adjacent edge portions of said cover.

32. The storage unit of claim 1 wherein said magazine includes a magazine case having said magazine slots therein and a detachable cover, said cover having a top side positioned above the cassettes when the cassettes are positioned in said magazine slots, said cover further including a strip of resilient material adhered to an inside surface of said cover top side, said strip extending along said cover top side sufficient to overlap all cassettes in said magazine slots and having sufficient thickness to engage the cassettes in said magazine slots when said cover is installed on said base and apply a spring force on the cassettes to hold them against movement within said magazine.

33. The storage unit of claim 1 for use with cassettes having an aperture therein, wherein said magazine has walls defining said magazine slots, one of said walls for each of said slots having a recess with a button moveably positioned therein and projecting toward an adjacent one of said magazine slots, said button being biased to move sufficiently i said adjacent magazine slot to project into the aperture in the cassette positioned in said adjacent magazine slot and releasably hold the cassette therein, and upon sufficient force applied by the cassette through operation of said gripper arms, said button being moveable toward said recess to release the cassette.

34. The storage unit of claim 33 wherein said button is mounted on a member having opposing edge portions, and said wall recess includes a pair of side grooves which receive and retain therein said button member edge portions, said side grooves having sufficient width to permit movement of said button member toward said adjacent magazine slot to allow said button to project into the cassette aperture and away from said adjacent magazine slot to release the cassette from said adjacent magazine slot.

35. The storage unit of claim 34 wherein said button is biased toward said adjacent magazine slot by a resilient foam spring positioned between said wall in which said recess is formed and said button member.

36. A computer storage unit usable with tape cassettes and a magazine having a plurality of slots, each magazine slot being sized to releasably hold one of the cassettes and having an open side, comprising:
　a tape drive having an opening to receive one of the tape cassettes;
　a carriage to which the magazine is releasably attachable for travel therewith with the open sides of the magazine slots toward said tape drive opening;
　a carriage drive providing drive to said carriage to selectively move said carriage laterally relative to said tape drive opening, said carriage drive being operable to move said carriage laterally to position a selected one of the magazine slots at said tape drive opening and hold the magazine slot in generally planar alignment with said tape drive opening for selected movement of one of the cassettes between the selected magazine slot and said tape drive opening;
　rotatable between a grasping position with said gripper arms closed sufficiently to grasp one of the cassettes, a pushing position with said gripper arms closed sufficiently to engage and push against one of the cassettes, and an open position with said gripper arms open sufficiently to receive one of the cassettes therebetween and release the cassette if grasped therein;
　a traveler having said gripper arms attached for travel therewith;
　a traveler drive providing drive to said traveler to selectively move said traveler so as to move said gripper arms attached thereto between the selected magazine slot and said tape drive opening;
　an actuator mounted to said traveler for travel therewith, said actuator selectively rotating said gripper arms between said grasping position to grasp one of the cassettes, said pushing position to push one of the cassettes toward said tape drive opening, and said open position in preparation for grasping one of the cassettes or to release the cassette if grasped therein; and
　controller means for controlling operation of said actuator and said traveler drive to selectively rotate and move said gripper arms to move selected ones of the cassettes in the magazine slots into said tape drive opening and remove the cassette therein from said tape drive opening and return the cassette to a desired one of the magazine slots.

37. The storage unit of claim 36 wherein said controller means for controlling operation of said actuator and said traveler drive includes selectively controlling said actuator and said traveler drive to position said gripper arms at the selected magazine slot to grasp the cassette therein, and then to move said gripper arms with the cassette grasped therein toward said tape drive opening and upon partial insertion therein prior to engagement by said tape drive to release the cassette, and then to rotate said gripper arms into said pushing position and push the cassette sufficiently far into said tape drive opening for engagement by said tape drive.

38. The storage unit of claim 36 wherein said controller means for controlling operation of said actuator and said traveler drive includes selectively controlling said actuator and said traveler drive to move said traveler to position said gripper arms at said tape drive opening to grasp the cassette therein when ejected by said tape drive and then to move said gripper arms with the cassette grasped therebetween toward the selected magazine slot and upon return of the cassette to the selected magazine slot to release the cassette.

39. The storage unit of claim 38 for use with digital audio tape cassettes having a movable cover door which is in the open position when the cassette is within said tape drive and a closed position when the cassette is sufficiently withdrawn from said tape drive and having a fixed portion exposed when the cassette is ejected from said tape drive, wherein said controller means for controlling operation of said actuator and said traveler drive includes selectively controlling said actuator and said traveler drive to initially grasp the cassette by the fixed portion of the cassette when ejected, then to move said gripper arms with the cassette grasped therebetween by the fixed portion toward the selected magazine slot until the movable cassette cover door returns to the closed position, then to release the cassette and grasp the cassette by the closed cover door of the cassette, and then to move said gripper arms with the cassette grasped therebetween by the closed cover door toward the selected magazine slot and upon return of the cassette to the selected magazine slot to release the cassette.

40. The storage unit of claim 1 further including light means for generating a beam of light and detecting when said beam is broken and, when broken, generating a broken beam signal, said light means projecting said beam across said tape drive opening, and wherein said controller means for controlling operation of said actuator and said traveler drive further includes controlling operation of said actuator and said traveler drive during a test cycle to selectively rotate and move said gripper arms to sequentially move from each of the magazine slots any cassette therein toward said tape drive opening sufficient to break said beam, and the storage unit further includes means for determining the presence or absence of a cassette in each of the magazine slots based upon whether or not said broken beam signal is generated when said gripper arms are moved toward said tape drive opening sufficient to break said beam if a cassette were in the particular one of the magazine slots at which said gripper arms are positioned.

41. The storage unit of claim i for use with cassettes that cannot be fully inserted into said tape drive opening if inserted backwards, wherein said traveler drive includes a stepper motor, and said controller means for controlling operation of said actuator and said traveler drive further includes controlling operation of said actuator and said traveler drive during a test cycle to selectively rotate and move said gripper arms to sequentially move the cassette from each of the magazine slots having one therein toward said tape drive opening a preselected distance, said controller means including a counter to count the steps said stepper motor operates when attempting to move the cassette said preselected distance and a comparator to compare said counted steps for each cassette to a predetermined number of steps required to move a cassette said preselected distance if correctly positioned in the magazine slot, said controller means generating an error signal indicating a difference in said counted steps and said predetermined steps if such occurs to thereby indicate a cassette is in backwards in the magazine slot.

42. A method of performing computer storage using tape cassettes, comprising:
providing a tape drive having an opening to receive one of the tape cassettes;
providing a carriage;
providing a carriage drive which drives said carriage to selectively move said carriage laterally relative to said tape drive opening;
providing a magazine having a plurality of slots, each said magazine slot being sized to releasably hold one of the cassettes and having an open side positionable toward said tape drive opening;
releasably attaching said magazine to said carriage for travel therewith with said open sides of said magazine slots positioned toward said tape drive opening;
operating said carriage drive to move said carriage laterally to position a selected one of said magazine slots at said tape drive opening and hold said magazine slot in generally planar alignment with said tape drive opening for selected movement of one of the cassettes between said selected magazine slot and said tape drive opening;
providing a pair of gripper arms rotatable between a grasping position with said gripper arms closed sufficiently to grasp one of the cassettes, a pushing position with said gripper arms closed sufficiently to engage and push against one of the cassettes, and an open position with said gripper arms open sufficiently to receive one of the cassettes therebetween and release the cassette if grasped therein;
providing a traveler having said gripper arms attached for travel therewith;
providing a traveler drive which drives said traveler to selectively move said traveler so as to move said gripper arms attached thereto between said selected magazine slot and said tape drive opening;
providing an actuator mounted to said traveler for travel therewith, said actuator being selectively operable to rotate said gripper arms between said grasping position to grasp one of the cassettes, said pushing position to push one of the cassettes toward said tape drive opening, and said open position in preparation for grasping one of the cassettes or to release the cassette if grasped therein; and
controlling operation of said actuator and said traveler drive to selectively rotate and move said gripper arms to move selected ones of the cassettes in said magazine slots into said tape drive opening and remove the cassette therein from said tape drive opening and return the cassette to a desired one of said magazine slots.

43. The method of claim 42 wherein said step of controlling operation of said actuator and said traveler drive includes positioning said gripper arms at said selected slot to grasp the cassette therein, then moving said gripper arms with the cassette grasped therein toward said tape drive opening, then upon partial insertion therein prior to engagement by said tape drive releasing the cassette, then rotating said gripper arms into said pushing position and then pushing the cassette with said gripper arms sufficiently far into said tape drive opening for engagement by said tape drive.

44. The method of claim 42 wherein said step of controlling operation of said actuator and said traveler drive includes moving said traveler to position said gripper arms at said tape drive opening to grasp the cassette therein when ejected by said tape drive, then moving said gripper arms with the cassette grasped therebetween toward said selected slot, and then upon return of the cassette to said selected slot releasing the cassette.

45. The method of claim 44 for use with digital audio tape cassettes having a movable cover door which is in the open position when the cassette is within said tape drive and a closed position when the cassette is sufficiently withdrawn from said tape drive and having a fixed portion exposed when the cassette is ejected from said tape drive, wherein said step of controlling operation of said actuator and said traveler drive includes initially grasping the cassette by the fixed portion of the cassette when ejected, then moving said gripper arms with the cassette grasped therebetween by the fixed portion toward said selected slot until the movable cassette cover door returns to the closed position, then releasing the cassette, then grasping the cassette by the closed cover door of the cassette, then moving said gripper arms with the cassette grasped therebetween by the closed cover door toward said selected slot, and then upon return of the cassette to said selected slot releasing the cassette.

46. The method of claim 42 for use with digital audio tape cassettes having a protruding fixed portion exposed when the cassette is ejected from said tape drive, further including providing one of said gripper arms with a face portion facing generally toward the other of said gripper arms, and wherein said step of controlling operation of said actuator and said traveler drive includes frictionally engaging the protruding fixed portion of the cassette with said face portion after being initially removed from said tape drive opening.

47. The method of claim 42 further including:
providing a light source generating a beam of light and a light detector;
positioning said light source and detector such that said beam projects across said tape drive opening;
detecting when said beam is broken and, when broken, generating a broken beam signal; and
wherein said step of controlling operation of said actuator and said traveler drive includes operation during a test cycle comprising rotating and moving said gripper arms to sequentially move from each of said magazine slots any cassette therein toward said tape drive opening sufficient to break said beam, and determining the presence or absence of a cassette in each of said magazine slots based upon whether or not said broken beam signal is generated when said gripper arms are moved toward said tape drive opening sufficient to break said beam if a cassette were in the particular one of said magazine slots at which said gripper arms are positioned.

48. The method of claim 42 for use with cassettes that cannot be fully inserted into said tape drive opening if inserted backwards, further including providing a stepper motor as part of said traveler drive, and wherein said step of controlling operation of said actuator and said traveler drive includes operation during a test cycle comprising rotating and moving said gripper arms to sequentially move the cassette from each of said magazine slots having one therein toward said tape drive opening a preselected distance, counting the steps said stepper motor operates when attempting to move the cassette said preselected distance, comparing said counted steps for each cassette to a predetermined number of steps required to move a cassette said preselected distance if correctly positioned in said magazine slot, and generating an error signal indicating a difference in said counted steps and said predetermined steps if such occurs to thereby indicate a cassette is in backwards in said magazine slot.

49. The method of claim 42 further including:
providing a detector to detect when one of the cassettes has been moved a preselected distance toward said tape drive opening;
generating a detection signal when a cassette has been detected by said detector; and
wherein said step of controlling operation of said actuator and said traveler drive includes operation during a test cycle comprising rotating and moving said gripper arms to sequentially move from each of said magazine slots any cassette therein toward said tape drive opening sufficient to be detected by said detector, and determining the presence or absence of a cassette in each of said magazine slots based upon whether or not said detector signal is generated when said gripper arms are moved toward said tape drive opening sufficient for a cassette to be moved said preselected distance if a cassette were in the particular one of said magazine slots at which said gripper arms are positioned.

50. The method of claim 49 for use with cassettes that cannot be fully inserted into said tape drive opening if inserted backwards as a result of blocking contact with said tape drive, further including providing a stepper motor as part of said traveler drive, selecting said preselected distance sufficiently large to allow a cassette in backwards in said magazine slot to be moved into blocking contact with said tape drive so as to thereby inhibit further movement thereof toward said tape drive, such that upon contact with said tape drive said stepper motor will be unable to further move the cassette toward said tape drive opening and slip one or more steps, but sufficiently small to not fully insert a cassette correctly positioned in said magazine slot into said tape drive opening for operative engagement with said tape drive, counting the steps said stepper motor operates when attempting to move the cassette said preselected distance, comparing said counted steps for each cassette to a predetermined number of steps required to move a cassette said preselected distance if correctly positioned in said magazine slot, and generating an error signal indicating a difference in said counted steps and said predetermined steps if such occurs to thereby indicate a cassette is in backwards in said magazine slot.

51. The method of claim 42 further including:
providing a detector to detect when one of the cassettes is in a position between said magazine and said tape drive, not fully in one of said magazine slots or fully in said tape drive;
positioning said detector at said tape drive opening;
generating a detection signal when a cassette has been detected by said detector; and
controlling operation of said carriage drive in response to said detector signal.

52. The method of claim 42 further including:
providing a detector detecting when one of the cassettes is in a position to which ejected by said tape drive;
positioning said detector at said tape drive opening;
generating a detector signal when a cassette has been detected by said detector; and
controlling operation of said actuator and said traveler drive to selectively rotate and move said gripper arms to remove the ejected cassette from said tape drive and move the ejected cassette to a selected one of said magazine slots.

* * * * *

UNITED STATES PATENT AND TRADEMARK OFFICE
CERTIFICATE OF CORRECTION

PATENT NO. : 5,235,474

DATED : August 10, 1993

INVENTOR(S) : Nathan H. Searle

It is certified that error appears in the above-identified patent and that said Letters Patent is hereby corrected as shown below:

In column 16, claim 4, line 45, after "claim", please insert --1--.

In column 17, claim 8, line 4, after "claim", please insert --1--.

In column 17, claim 11, line 39, after "claim", please insert --10--.

In column 17, claim 14, line 59, after "claim", please insert --1--.

In column 20, claim 29, line 37, after "claim", please insert --1--.

In column 20, claim 32, line 61, please delete "case" and substitute therefor --base--.

In column 21, claim 33, line 11, please delete "i" and substitute therefor --into--.

In column 21, claim 36, line 51, please insert --a pair of gripper arms-- before "rotatable between".

UNITED STATES PATENT AND TRADEMARK OFFICE
CERTIFICATE OF CORRECTION

PATENT NO. : 5,235,474
DATED : August 10, 1993
INVENTOR(S) : Nathan H. Searle

It is certified that error appears in the above-indentified patent and that said Letters Patent is hereby corrected as shown below:

In column 21, claim 36, line 51, please insert --a pair of gripper arms-- before "rotatable between".

Signed and Sealed this

Fifth Day of April, 1994

Attest:

BRUCE LEHMAN

Attesting Officer

Commissioner of Patents and Trademarks